United States Patent
Pota et al.

(10) Patent No.: US 11,829,764 B2
(45) Date of Patent: Nov. 28, 2023

(54) ADDRESS MANIPULATION USING INDICES AND TAGS

(71) Applicant: MIPS Tech, LLC, San Jose, CA (US)

(72) Inventors: Parthiv Pota, Cupertino, CA (US); Sanjay Patel, San Ramon, CA (US); Raj Kumar Singh Parihar, San Jose, CA (US)

(73) Assignee: MIPS Tech, LLC, San Jose, CA (US)

( * ) Notice: Subject to any disclaimer, the term of this patent is extended or adjusted under 35 U.S.C. 154(b) by 0 days.

(21) Appl. No.: 18/118,580

(22) Filed: Mar. 7, 2023

(65) Prior Publication Data
US 2023/0205534 A1 Jun. 29, 2023

Related U.S. Application Data

(63) Continuation of application No. 17/364,718, filed on Jun. 30, 2021, now Pat. No. 11,635,963, which is a continuation of application No. 16/739,540, filed on Jan. 10, 2020, now Pat. No. 11,080,062.

(60) Provisional application No. 62/883,155, filed on Aug. 6, 2019, provisional application No. 62/867,966, filed on Jun. 28, 2019, provisional application No. 62/800,431, filed on Feb. 2, 2019, provisional application No. 62/791,788, filed on Jan. 12, 2019.

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01)

(58) Field of Classification Search
None
See application file for complete search history.

(56) References Cited

U.S. PATENT DOCUMENTS

| | | | |
|---|---|---|---|
| 6,823,446 B1 * | 11/2004 | Sinharoy | G06F 9/3848 712/239 |
| 10,705,848 B2 * | 7/2020 | Vougioukas | G06F 9/3859 |
| 10,719,327 B1 * | 7/2020 | Al-Otoom | G06F 9/3806 |
| 2008/0072024 A1 * | 3/2008 | Davis | G06F 9/325 712/239 |

* cited by examiner

*Primary Examiner* — Michael Sun

(57) ABSTRACT

Techniques are disclosed for address manipulation using indices and tags. A first index is generated from bits of a processor program counter, where the first index is used to access a branch predictor bimodal table. A first branch prediction is provided from the bimodal table, based on the first index. The first branch prediction is matched against N tables, where the tables contain prior branch histories, and where: the branch history in table T(N) is of greater length than the branch history of table T(N-1), and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring.

20 Claims, 9 Drawing Sheets

| Budget Tables | Size (KB) | Num of Entries | Pred Ctr (bits) | #Pred Ctr | Hyst Ctr (bits) | Pos Ctr (bits) | #Pos Ctr | Tag (bits) | Useful Ctr (bits) | Hist len (bits) |
|---|---|---|---|---|---|---|---|---|---|---|
| Bimodal (B) | 10240 | 1024 | 1 | 8 | 2 | | | | | |
| Tagged T1 | 8192 | 512 | 3 | 1 | | 2 | 1 | 9 | 2 | 3 |
| Tagged T2 | 8192 | 512 | 3 | 1 | | 2 | 1 | 9 | 2 | 9 |
| Tagged T3 | 8192 | 512 | 3 | 1 | | 2 | 1 | 9 | 2 | 27 |
| Total | 34816 | | | | | | | | | |

FIG. 4

ADDRESS MANIPULATION USING INDICES AND TAGS

RELATED APPLICATIONS

This application is a continuation of U.S. patent application Ser. No. 17/364,718, filed on Jun. 30, 2021, which is a continuation of U.S. patent application Ser. No. 16/739,540, filed on Jan. 10, 2020, which claims the benefit of U.S. provisional patent applications "Address Manipulation Using Indices and Tags" Ser. No. 62/791,788, filed Jan. 12, 2019, "Neural Network Processing Using Mixed-Precision Data Representation" Ser. No. 62/800,431, filed Feb. 2, 2019, "Mixed-Precision Data Computation for Neural Network Reduction Operands" Ser. No. 62/867,966, filed Jun. 28, 2019, and "Neural Network Data Computation Using Mixed-Precision" Ser. No. 62/883,155, filed Aug. 6, 2019.

Each of the foregoing applications is hereby incorporated by reference in its entirety.

FIELD OF ART

This application relates generally to address manipulation and more particularly to address manipulation using indices and tags.

BACKGROUND

The rapid processing of large amounts of data is a computationally complex undertaking. The volume of collected data such as image data, voice data, device usage data, among others, is increasing tremendously. The data is collected from personal electronic devices, from devices among the Internet of Things (IoT), and from the users of the devices. The collected data includes user interactions with the electronic devices, user activities such as online shopping and web surfing, user interactions with IoT devices in smart homes, and numerous additional sources. The collected data is analyzed by various organizations and entities such as governments, researchers, and commercial ventures for many purposes. The collected data is aggregated into immense datasets commonly referred to as "big data". The use of conventional processors and analysis techniques for processing this collected data is intractable. The processing requirements far outstrip the capabilities of the processors and techniques. Further data requirements, such as the capture, storage, maintenance, access, transmission, and visualization of the data, further complicate data analysis and processing. These further data processing and handling requirements quickly saturate the traditional system capabilities. Tractable and scalable techniques for data processing and handling are required. Innovative hardware architectures and software techniques, algorithms, heuristics, and so on, are needed. The users or owners of the datasets have financial or intellectual motives for analyzing the data contained within. Further analysis motivations include business analytics; disease detection, tracking, and control; crime detection and prevention; meteorology; and complex science and engineering simulations, to name only a very few. Advanced applications such as predictive analytics can also benefit from the data analysis techniques. Many endeavors of human interaction can likewise benefit from such advanced applications for the furthering of humankind and its progeny.

Processing architectures that are based on reconfigurable processors show promise for the advanced data handling and processing tasks. The reconfigurable processors can be based on programmable devices such as CPUs and GPUs, field programmable gate arrays, application specific gate arrays, and other configurable and reconfigurable architectures. These reconfigurable computing architectures can integrate the desirable characteristics of the advanced hardware approaches and software techniques. A reconfigurable computing architecture is "coded" or programmed to configure or adapt the architecture to a variety of computational techniques. In addition, the reconfigurable architecture can include an underlying high-performance hardware architecture. As a result, reconfigurable architectures can be arranged for processing requirements of the many applications demanding high performance computing. Applications including digital signal processing (DSP), medical image processing, machine learning, matrix computations, tensor computations, image or voice data analysis, and so on, are successfully served by the capabilities of a reconfigurable architecture. The reconfigurable architecture is particularly well suited to data analysis when the data can include specific types of data, large quantities of unstructured data, sample data, and the like. The reconfigurable architecture can be configured to achieve these and other processing objectives.

SUMMARY

A program or code can be executed for a variety of processing purposes. The code can include algorithms for operating an autonomous vehicle, processing media for distribution, processing image or speech data, implementing machine vision, and so on. The code can include a sequence of instructions that perform the many operations which comprise the processing tasks. Within the code, decisions can be executed. The decisions can include whether an input file is open, whether there is data remaining to be processed, whether an output file is open, whether computing resources are available, etc. The decisions can include higher level operations such as proper vehicle speed and direction, matching speech data to the voice of an individual, and the like. The decisions made within the code can alter the order of execution of a sequence of instructions. The decisions can be realized by branch instructions. A branch instruction can cause execution of the code to transfer from one sequence of instructions within the code to another sequence of instructions with the code. The transfer is implemented by changing or manipulating the address of the next instruction to be fetched for decoding and execution.

Embodiments include a processor-implemented method for address manipulation comprising: generating a first index from one or more bits of a processor program counter, wherein the first index is used to access a branch predictor bimodal table; providing a first branch prediction from the bimodal table, based on the first index; matching the first branch prediction against N tables, wherein N is three or more, the tables contain prior branch histories, and wherein: the branch history in table T(N) is of greater length than the branch history of table T(N-1), and the branch history in table T(N-1) is of greater length than the branch history of table T(N-2); manipulating a processor address using a greatest length of hits of branch prediction matches from the N tables, based on one or more hits occurring; and manipulating the branch predictor address using the first branch prediction from the bimodal table, based on zero hits occurring.

In embodiments, the manipulating the branch predictor address is used for accessing a branch predictor array. In embodiments, the branch predictor bimodal table is direct mapped. And in some embodiments, the branch predictor bimodal table is tagless. Some embodiments comprise generating a second, a third, and a fourth index, wherein the second index is used in table T(N), the third index is used in table T(N-1), and the fourth index is used in table T(N-2). In embodiments, the second, third, and fourth indices are generated using hashing.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4 illustrates a storage budget table.

DETAILED DESCRIPTION

Figure 1:
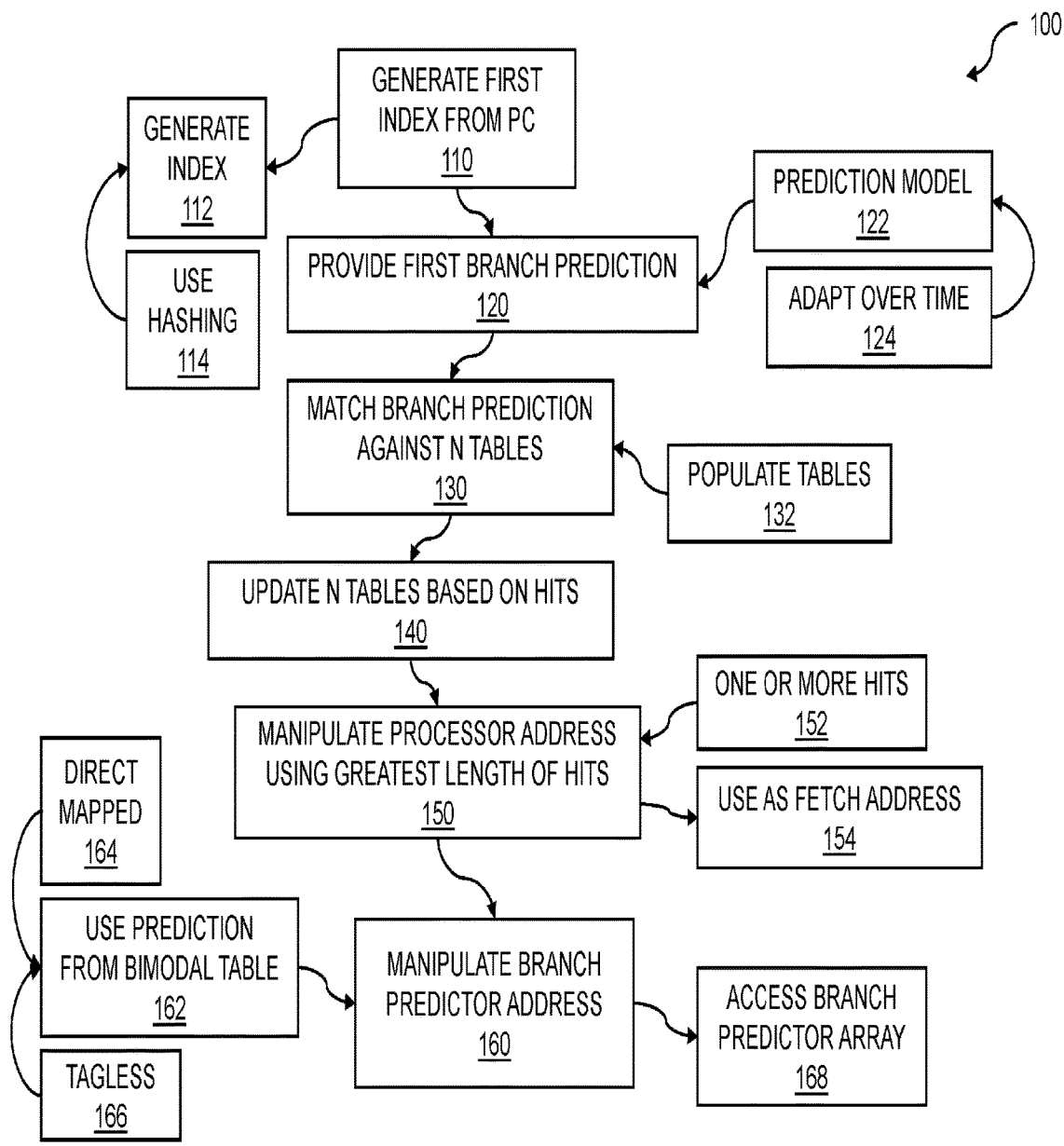
FIG. 1 is a flow diagram for address manipulation using indices and tags.

Address manipulation can be performed using indices and tags. Accurately predicting the outcome of a branch instruction encountered within a sequence of instructions can have a profound effect on processing time. If the branch is taken, then processing of instructions shifts from the current sequence of instructions to another sequence of instructions. The shift can be effected by manipulating a processor address such as a program counter. Accurately predicting that a branch is taken or not taken can enable a processor to prefetch instructions from the address following the branch, to commence decoding the instructions, to prefetch data, and the like. If the branch is not correctly predicted, then processing cycles can be lost while the instructions from the incorrect address are dumped and the instructions from the correct address are fetched. The likelihood that a branch prediction will be useful or correct can be enhanced by examining a depth of the branch history. The branch history can reveal that a branch, such as an unconditional branch, is taken every time, taken every other time, taken every third time, never taken, and so on.

Techniques for address manipulation using indices and tags are disclosed. The address manipulation can be used for providing a branch prediction based on a greatest number of hits of a branch prediction against various length tables of branch histories. The branch histories can include branch histories for one or more branch instructions encountered within a code sequence. A first index is generated from one or more bits of a processor program counter. The first index is used to access a branch predictor bimodal table. The branch predictor bimodal table can be direct mapped, where direct mapping can include a one-to-one correspondence between an address and a table entry. The branch predictor bimodal table can be tagless. A tagless table can include a table which has not been hashed, encoded, etc. A first branch prediction is provided from the bimodal table, based on the first index. The first branch prediction can be a simple prediction such as branch always taken or branch never taken, a prediction based on execution history, a prediction based on code sampling, and the like. Further indices including a second, a third, and a fourth index can be generated. The indices can be used to access various tables. The second index is used in table T(N), the third index is used in table T(N-1), and the fourth index is used in table T(N-2). The first branch prediction is matched against N tables, where N is three or more. The N tables contain prior branch histories of one or more branch instructions encountered within a sequence of instructions. Further, the branch history in table T(N) is of greater length than the branch history of table T(N-1), and the branch history in table T(N-1) is of greater length than the branch history of table T(N-2). A processor address is manipulated using a greatest length of hits of branch prediction matches from the N tables, based on one or more hits occurring. The manipulating can include loading an address for a next instruction to be fetched subsequent to a branch instruction. The greatest length of hits of branch prediction matches can increase the "usefulness" of a prediction, where a useful prediction is valid. A valid prediction is a prediction that is found to be true when the branch instruction is executed. At times, a match between the first branch prediction and the branch histories within the N tables may not be found. In the case of no match, a default, backup, or other address may be used for the manipulating. The branch predictor address is manipulated using the first branch prediction from the bimodal table, based on zero hits occurring. The first branch prediction from the bimodal table can be the default prediction.

FIG. 1 is a flow diagram for address manipulation using indices and tags. Indices and tags can be used for accessing one or more tables containing branch histories for branch instructions that can be encountered when executing sequences of instructions within a program, code, function, routine, subroutine, and so on. The usefulness of a branch prediction can be determined based on a number of matches or "hits" of the branch prediction within tables of branch histories. The branch prediction is used for address manipulation, where an address can include the address of the next instruction to be fetched for execution. The flow 100 includes generating a first index from one or more bits of a processor program counter 110. A program counter (PC) can be a register or other storage component that is used to access instructions within a sequence of instructions. The program counter can point to the next instruction to be fetched for execution. The program counter can include a number of bits, where the number of bits can correspond to the address of the next instruction. When instructions are executed sequentially, the PC can be incremented after fetching an instruction so that the PC points to the next instruction within the sequence of instructions. Operations other than an increment can be performed on the PC. The PC can be loaded with an address other than the current address plus one. The other address can correspond to an address pointed to or targeted by a branch instruction, a jump instruction or unconditional branch, and so on.

In the flow 100, the first index is used to access a branch predictor bimodal table. A branch predictor bimodal table, or direct history table, can use an address of a given branch instruction as an index to a table in which bits relating to a branch prediction can be stored. Branch instruction bits index the table for access to the branch prediction. The branch prediction can be updated when the outcome of the branch is known. Tables in an additional branch predictor bimodal table can be included for branch prediction. The number of additional tables can include three or more additional tables. The flow 100 further includes generating a second, a third, and a fourth index, wherein the second index is used in table T(N), the third index is used in table T(N-1), and the fourth index is used in table T(N-2) 112. As discussed throughout, the tables can include various depths of branch histories, where the branch histories are associated with one or more branch instructions encountered within the sequence of code. In embodiments, the second, third, and fourth indices are generated using hashing 114. The hashing can be accomplished using a variety of techniques such as techniques based on cyclic redundancy codes, statistical distributions, randomization, and so on.

The flow 100 includes providing a first branch prediction 120 from the bimodal table, based on the first index. As discussed throughout, the bimodal table can generate a branch prediction based on a simple rule. The simple rule can include a prediction where the branch is always taken, a prediction where the branch is never taken, and so on. In embodiments, the first branch prediction can be based on a prediction model 122. A prediction model can be based on analysis of the instruction code sequence, a statistical analysis, and so on. The prediction model can be based on a model for deep learning. In embodiments, the prediction model can adapt over time 124 based on a rate of prediction matches.

The flow 100 includes matching the first branch prediction against N tables 130. The tables can be present in addition to the bimodal table which is used for a first branch prediction. In the context of the tables, N can include three or more. The three or more tables can contain prior branch histories. The prior branch histories can be accumulated for one or more branch instructions within the sequence of instructions that are executed. The branch histories can include branches taken, such as unconditional branches or conditional branches for which a condition was met, branches not taken, and so on. The branch histories can include a number of successful branch predictions for a given branch. The number of successful branch predictions can be incremented each time a branch prediction is valid, decremented each time a branch prediction is invalid, etc. The branch histories within the N tables can be the same length or different lengths. In embodiments, the branch history in table T(N) is of greater length than the branch history of table T(N-1), and the branch history in table T(N-1) is of greater length than the branch history of table T(N-2). The tables can be populated based on executing the sequence of instructions, by analyzing the instructions, by preprocessing the instructions, and so on. Further embodiments include populating one or more of the N tables 132 based on runtime sampling of instruction branches.

The flow 100 includes updating the contents of the N tables 140, based on the one or more hits occurring. As discussed throughout, when a branch is encountered within the sequence of instructions being executed, a recording of whether the branch was taken or not taken can be made. In embodiments, the contents of the N tables can include branch histories. The branch histories can be updated when a match between a branch prediction and a branch history within one of the N tables is found. The branch history can be incremented when a match is found and the prediction is valid. If the prediction is invalid, such as the branch should be taken and is not taken, or the branch should not be taken but is taken, then the history can be decremented. Other updating techniques can be used.

The flow 100 includes manipulating a processor address using a greatest length of hits 150 of branch prediction matches from the N tables. The manipulating can be based on one or more hits 152 occurring. The number of prediction matches within a table can vary from table to table since the depths of the tables may differ. Further, the tables may not contain the same branch histories for a particular branch instruction. The branch prediction can include taking the branch, not taking the branch, and so on. A prediction that the branch will be taken can manipulate the processor address to the branch target address. The branch target address can include the address of the first instruction to execute subsequent to taking the branch. The processor address can include the contents of the program counter (PC). In embodiments, the processor address that was manipulated can be used as a fetch address 154. The fetch address can point to a single instruction, a sequence or block of instructions, and so on.

The flow 100 includes manipulating a processor branch predictor address 160 using a greatest length of hits of branch prediction matches from the N tables, based on one or more hits occurring. The manipulating the processor address can include loading an address for an instruction to be fetched following evaluation of a branch instruction. The manipulating the processor address can be based on the prediction from the table of the N tables that has the greatest number of hits. The greatest number of matches or hits can imply that the prediction based on the table with the most hits can be the "most useful" prediction. The most useful prediction can include a prediction which has been correct or valid the greatest number of times during prior evaluations of the branch instruction. In the event that there are no matches of the first branch prediction against the prior branch histories in the N tables, then the manipulation can be based on the first branch prediction. The flow 100 includes manipulating the branch predictor address using the first branch prediction from the bimodal table 162, based on zero hits occurring. The first prediction can include a default prediction, a backup prediction, and so on. In embodiments, the branch predictor bimodal table can be direct mapped 164. An element of a direct-mapped table can be accessible using a single index associated with the element. In further embodiments, the branch predictor bimodal table can be tagless 166. Since the bimodal table is direct mapped rather than organized using another technique such as hashing, no tag such as a hashtag is required to access the contents of the bimodal table. In embodiments, the manipulating the branch predictor address can be used for accessing a branch predictor array 168. The manipulating the branch predictor address can be used for accessing one or more of the N tables. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
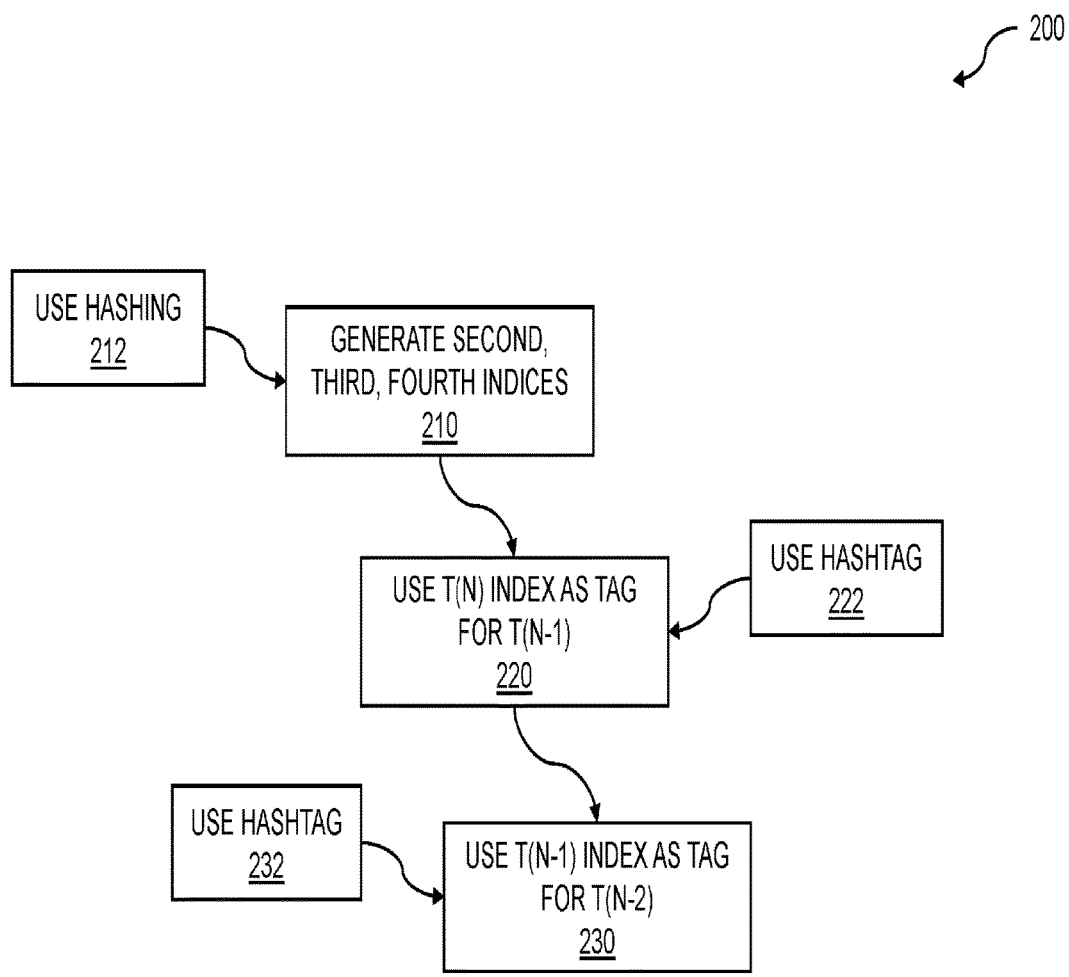
FIG. 2 is a flow diagram for index generation.

FIG. 2 is a flow diagram for index generation. An index that can be used for accessing a branch predictor table can be generated. One or more further indices that can be used to access one or more branch history tables can also be generated. The results of accessing the branch predictor table and the one or more branch history tables can be used to predict an address for the next instruction to be fetched during program execution. Branch prediction supports address manipulation using indices and tags. A first index is generated from one or more bits of a processor program counter, where the first index is used to access a branch predictor bimodal table. A first branch prediction is provided from the bimodal table, based on the first index. The first branch prediction is matched against N tables, where N is three or more, where the tables contain prior branch histories, and where: the branch history in table T(N) is of greater length than the branch history of table T(N-1), and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring.

The flow 200 includes generating 210 a second, a third, and a fourth index, where the second index is used in table T(N), the third index is used in table T(N-1), and the fourth index is used in table T(N-2). The tables can be of different lengths. The tables can include branch histories of one or more branch instructions that can be encountered while executing a given program, code, routine, subroutine, function, and so on. The indices can be generated using a variety of techniques. In embodiments, the second, third, and fourth indices can be generated using hashing 212. The hashing used to generate the indices can be accomplished using a variety of techniques. In embodiments, the hashing can be accomplished by computing a cyclic redundancy code, using a uniform distribution or other distribution function, and so on. The hashing function can be simple or complex. A choice about which hashing function to use can be based on computational complexity, storage requirements, etc.

In the flow 200, the index for table T(N) is used as a tag for table T(N-1) 220. The tag can be used to access table T(N-1). In embodiments, the tag that is used to access table T(N-1) can be a hashtag 222. The hashtag is used to efficiently search for branch prediction matches within table T(N-1). The hashtag can be used to narrow the search for branch prediction matches within the table. In the flow 200, the index for table T(N-1) is used as a tag for table T(N-2) 230. The tag can be used to access the table T(N-2). In embodiments, the tag for table T(N-2) can include a hashtag 232. As for the using a hashtag for other tables, the hashtag for table T(N-2) can be used to narrow a search for prediction matches within the table. In addition to searching for branch prediction matches or "hits", the hashtags can be used to update branch histories within the tables. Further embodiments include updating the contents of the N tables, based on the one or more hits occurring. The updating the contents of the N tables can include incrementing a branch history when a branch prediction is valid, decrementing the branch history when a branch prediction is invalid, etc. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
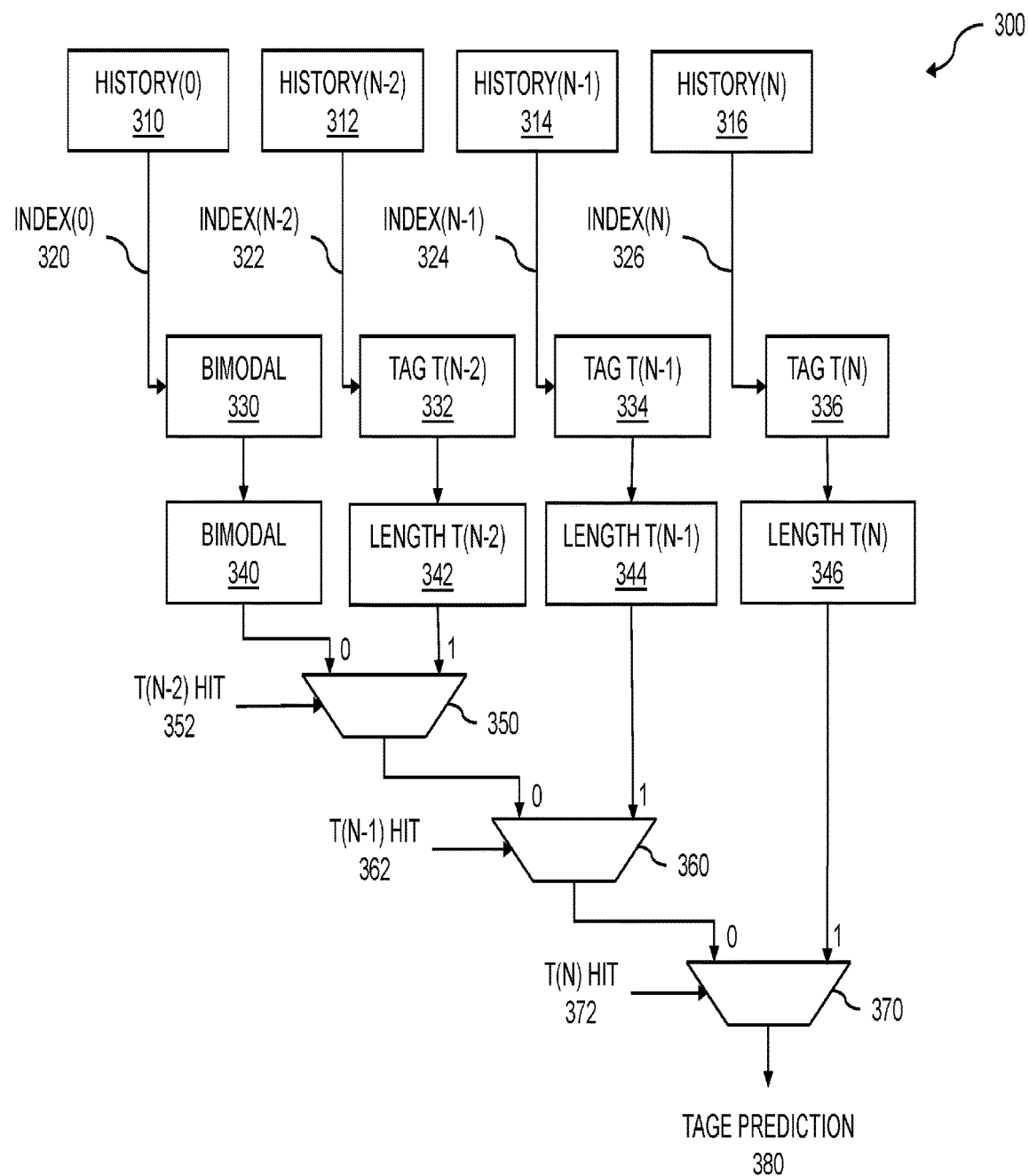
FIG. 3 is a block diagram for branch prediction.

FIG. 3 is a block diagram for branch prediction. Branch prediction can include matching a branch prediction against one or more tables that can contain prior branch histories. A branch prediction can include a "starting" or "initial" branch prediction, where a starting branch prediction can include always taking the branch or never taking the branch. A branch prediction can match or "hit" one or more branch predictions in the branch history tables. A large number of hits can indicate a value or "usefulness" of the prediction. In embodiments, the higher the number of hits within a branch history table, the better or "more useful" the branch prediction. Branch prediction can include address manipulation using indices and tags. A first index is generated from one or more bits of a processor program counter, wherein the first index is used to access a branch predictor bimodal table. A first branch prediction is generated from the bimodal table, based on the first index. The first branch prediction is matched against N tables, where N is three or more, where the tables contain prior branch histories, and where: the branch history in table T(N) is of greater length than the branch history of table T(N-1), and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring. The manipulating the branch predictor address is used for accessing a branch predictor array.

Branch prediction is a technique which can be used to increase processing speed. When this process is successful, prediction of whether a branch will be taken enables prefetching, decoding, and so on of instructions that follow the branch instruction. If the prediction is wrong, then any erroneously prefetched instructions are dumped, and the processor must wait while the correct instructions are fetched. Incorrect or invalid branch prediction can be computationally expensive, thus reinforcing the importance of correct prediction. The accuracy of the branch predictions can be significantly enhanced by examining execution histories of the branch instructions. The branch histories can reveal branching patterns such as the branch being taken every third time the branch instruction is executed and otherwise not being taken. A looping instruction can be an example of an instruction that could cause such branching behavior.

Branch prediction 300 can be based on one or more histories of branches. The branches can be encountered while executing a program, code, routine, procedure, function, etc. Each time a branch instruction is encountered, a history of executing the branch instruction can be formed, where the history records whether the branch was taken. Further embodiments include populating one or more of the N tables based on runtime sampling of instruction branches. A prediction can be made based on the historical branch record about whether the branch will be taken the next time the branch instruction is encountered. The one or more histories can include history(0) 310, history(N-2) 312, history(N-1) 314, history(N) 316, and so on. While four histories are shown, other numbers of histories such as more histories or fewer histories may also be used. The histories can record the branch histories of one or more branch instructions. The branch histories can include branch addresses. The contents of a history, and the branch address, can be used as an index to access one or more tables. The contents of the table can be accessed by using the index. In embodiments, the contents of history(0) can be used as index(0) 320 to access a bimodal table 330; history(N-2) can be used as index(N-2) 322 to access a tagged predictor table tag T(N-2) 332; history(N-1) can be used as index(N-1) 324 to access a tagged predictor table tag T(N-1) 334; history(N) can be used as index(N) 326 to access a tagged predictor table tag T(N) 336; and so on. In embodiments, the sizes of two or more of the N tables can be different. The tables can be accessible using various addressing techniques that can include direct mapping, indexing, tagging, etc. In embodiments, the branch predictor bimodal table is direct mapped. Within a direct-mapped table, an element of the table is accessible using a single index associated with the element. In embodiments, a single index of the directed mapped table is associated with a single element of the direct-mapped bimodal table. The bimodal table can be direct mapped to enable fast or unique access to the contents of the table elements. In embodiments, the branch predictor bimodal table can be tagless. Since the bimodal table is direct mapped rather than organized using another technique such as hashing, a tag such as a hashtag is not necessarily required to access the contents of the bimodal table.

The indices 322, 324, and 326 can be generated. Embodiments include generating a second 322, a third 324, and a fourth 326 index. The fourth index is used in table T(N-2) 332, the third index is used in table T(N-1) 334, and the second index is used in table T(N) 336. Different from the direct-mapped bimodal table, the tables T(N), T(N-1), and T(N-2) can be hashed. To access these one or more other tables, the second, third, and fourth indices can be generated using hashing. Hashing can be used to map data of an arbitrary size to a fixed size. In example 300, the hashing can be used to map branch predictions of one or more branch instructions to the three or more branch history tables. The mapping can be accomplished using a tag such as a hashtag. In embodiments, the index for table T(N) is used as a tag for table T(N-1). Indices for one or more tables can be used as tags for one or more other tables. In embodiments, a tag for table T(N-2) can include a hashtag. The tag for a given table can include an index to one or more of the other tables. In embodiments, the index for table T(N-1) can be used as a tag for table T(N-2). As for other tables, the tag for table T(N-2) can include a hashtag.

As discussed throughout, one or more tags can be used for matching, where the matching can include matching a branch prediction against the one or more branch history tables. When a branch prediction match is found, the match counts as a "hit". A hit can indicate that a given branch prediction for a given branch instruction has been encountered during the execution of a sequence of code within a program, code, a function, a subroutine, and so on. A hit within the execution history can indicate that the prediction was valid. A valid prediction indicates that the prediction correctly predicted whether a given branch would be taken. The branch history can record a number of valid predictions where the number is one or more valid predictions. Each time a valid prediction is encountered, the number of hits can be incremented. The higher the number of hits, the more likely the branch prediction is valid. The branch history can record a number of invalid predictions by decrementing the number of hits. A length of branch hits can be determined based on the branch histories within the various tables. A prediction can be determined based on the contents of the bimodal table 340. A length of branch hits can be determined for each of the other tables. The length of branch hits can include length T(N-2) 342, length T(N-1) 344, length T(N) 346, and so on. In embodiments, a processor address can be manipulated using a greatest length (or quantity) of hits of branch prediction matches from the N tables, based on one or more hits occurring. To determine the greatest length of hits of branch prediction matches, the number of hits within a table can be tallied. Selecting the greatest length of a hit of branch prediction matches can be accomplished using two-to-one. If one or more match T(N) hits 372 occur with a length T(N) 346 in table T(N), selector 370 selects the branch prediction from table T(N). The selected branch prediction becomes the TAgged GEometric (TAGE) history length branch prediction 380. If one or more match T(N-1) hits 362 occur in table T(N-1), selector 360 selects the branch prediction from table T(N-1). The selected branch prediction becomes the TAGE history length branch prediction 380. Further, if one or more match T(N-2) hits 352 occur in table T(N-2), selector 350 selects the branch prediction from table T(N-2). The selected branch prediction becomes the TAGE history length branch prediction 380. Note that the lengths of branch history tables decrease from table T(N) to T(N-1), and from T(N-1) to T(N-2). The table with the longest branch history matches is preferentially selected over tables with shorter histories. Thus, branch history results can be selected based on the number of prediction hits even if a given branch prediction table is not the table with the greatest length.

At times during program execution, a branch instruction for which no branch history has yet been generated may be encountered. In such a scenario, attempts to match a branch prediction against the branch history tables can result in zero matches. If zero branch prediction matches occur, then the failover, default, backup, etc., TAGE prediction becomes the branch prediction from the bimodal table. The branch prediction from the bimodal table can include a "hardwired" branch prediction. The hardwired branch prediction can be based on a design decision made at the time a system architecture was created, a design team design policy, or another design approach. In embodiments, the hardwired or default branch prediction can include the branch being always taken, the branch being never taken, and so on. The effectiveness of such a default branch prediction policy can be influenced by the code that is being executed. For example, if a branch instruction is used only when a rare processing exception occurs, then the code execution performance penalty based on the prediction policy to never take the branch is minimal.

FIG. 4 illustrates a storage budget table 400. A storage budget table can be used to determine sizes of storage elements such as a branch predictor bimodal table, one or more branch history tables, and so on. The sizes of the storage elements can be assigned, calculated, estimated, and so on. The storage elements can be of similar sizes or different sizes. The storage elements can be used for address manipulation using indices and tags. A first index is generated from one or more bits of a processor program counter, where the first index is used to access a branch predictor bimodal table. A first branch prediction is provided from the bimodal table, based on the first index. The first branch prediction is matched against N tables, where N is three or more, where the tables contain prior branch histories, and where: the branch history in table T(N) is of greater length than the branch history of table T(N-1), and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring.

The storage budget table shows various allocations for tables associated with address prediction. The tables can include a branch predictor bimodal table and N other tables that can include prior branch histories. In embodiments, N is three or more tables. Associated with the bimodal tables and the N tables for prior branch histories is a table size in kilobytes. The sizes of the bimodal table with respect to other tables can be the same size or a different size. The storage budget table can include a number of entries. The entries can include addresses, branch histories, and the like. The storage budget table can include a number of bits for a prediction counter and a number prediction counters. The storage budget table can further include a number of bits for a hysteresis counter. Hysteresis can be used to take into account a history of a branch prior to the immediately previous time the branch was encountered. The storage budget table can include a number of bits for a position counter and a number of position counters. The position counters can be used to monitor the location of a control transfer instruction (CTI) in a program counter bundle. The position counter with the most significant bits (MSB) can indicate a branch taken where the MSB=1, or a branch not taken where the MSB=0. The storage budget table can include a number of bits for a tag. A tag such as a hashtag can be used to access a table. The storage budget table can include a number of bits for a "usefulness" counter. The usefulness counter can be based on a saturation counter and can be used to indicate the "usefulness" of a branch prediction. In embodiments, the branch prediction can include states of a saturating counter and can include strongly taken, weakly taken, weakly not taken, strongly not taken, and so on. Other numbers of states can be included for saturating counters larger than two bits. The storage budget table can include a history length. The history length can include fetch bundle history length, as described throughout.

Figure 5:
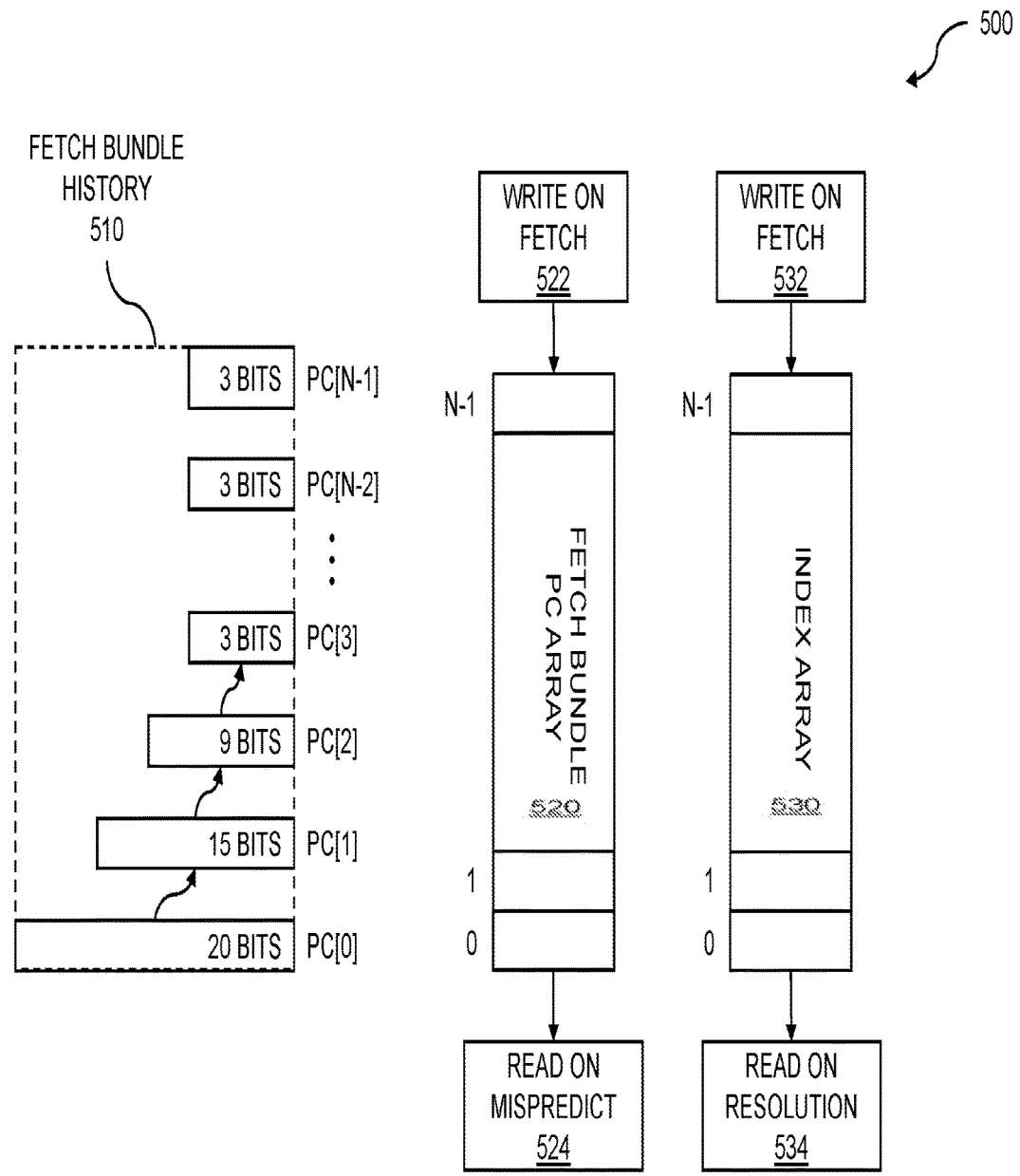
FIG. 5 shows a fetch bundle PC flow.

FIG. 5 shows fetch bundle PC flow. Instructions such as instructions within a sequence of instructions can be fetched prior to being executed. Such prefetching can significantly improve execution time by fetching subsequent instructions within the sequence of instructions while a current instruction is being executed. The technique of prefetching instructions within the sequence of instructions can break when a branch instruction is encountered. Taking the branch when the condition of the branch instruction is met can cause the sequence of instructions to be altered. Prefetch address determination can include manipulating the prefetch address based on a prediction regarding whether the branch will be taken or not. Address manipulation can be based on using indices and tags. A first index is generated from one or more bits of a processor program counter, wherein the first index is used to access a branch predictor bimodal table. A first branch prediction is provided from the bimodal table, based on the first index. The first branch prediction is matched against N tables, where N is three or more, where the tables contain prior branch histories, and where: the branch history in table T(N) is of greater length than the branch history of table T(N-1), and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring. In embodiments, the processor address that was manipulated is used as a fetch address.

A fetch bundle PC flow 500 can be used for calculation of one or more tags and one or more indices. The fetch bundle flow can include a fetch bundle history 510. An instruction fetch unit (IFU) can retain a number of the most recent fetch bundles. The number of bundles retained can include a power of two or another value in embodiments, and the number of most recent fetch bundles retained can include 16, 28, 32, and so on. A number of address bits can be stored within each element of the fetch bundle history. The number of address bits that are stored can be reduced for entries that are older than the current fetch bundle in the fetch bundle history. The number of bits retained can include 20 bits, 15 bits, 9 bits, 3 bits, and so on.

The fetch bundle history and the current fetch bundle can be used to calculate an index. The index that is calculated can be used to access one or more tables. The fetch bundle such as the current fetch bundle can include one or more branch instructions. A prediction about whether a branch will be taken can succeed (e.g. a hit) or fail (e.g. a miss). Since the branch prediction can miss, the calculated indices, the prediction, and other bits can be stored in tables. The index can be used to access one or more arrays. The one or more arrays can include a fetch bundle PC array 520. The fetch bundle PC array can be written 522 when a fetch is performed. The writing into the fetch bundle PC array maintains or updates the fetch bundle history. The one or more arrays can include an index array 530. The index array can be written on 532 when a fetch is performed. The sizes of the arrays 520 and 530 can be chosen, optimized, or derived based on analysis of the code to be executed; determined by trial and error; and so on. In embodiments, the sizes of the fetch bundle PC array and the index array can include 32 elements. A branch prediction can be determined by reading the fetch bundle PC array or by reading the index array. When a branch misprediction occurs, contents of an element of the fetch bundle PC array can be read 524. When a branch prediction can be resolved based on prior branches, contents of an element of the index array can be read 534.

Figure 6:
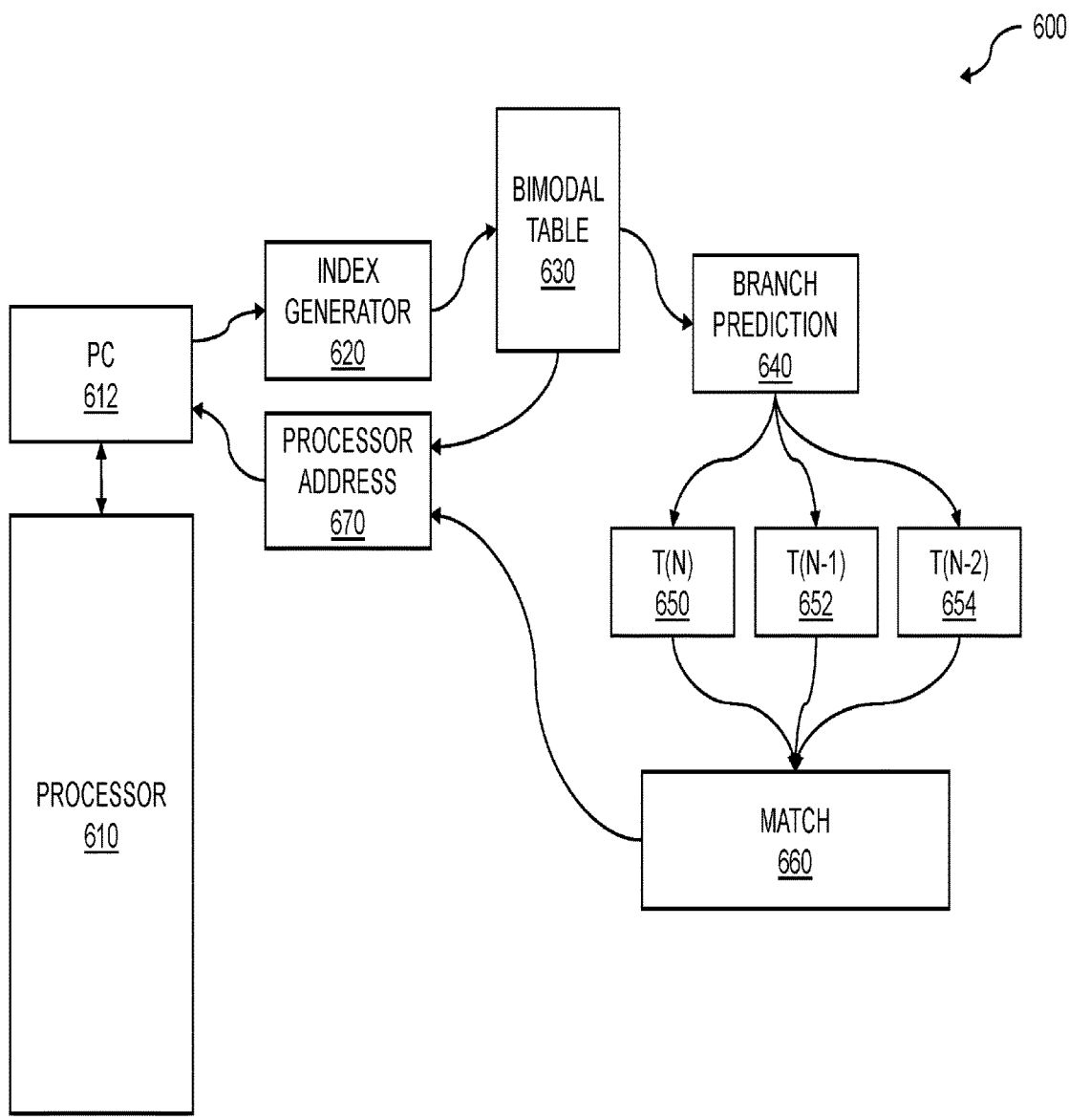
FIG. 6 illustrates a block diagram for processor address generation.

FIG. 6 illustrates a block diagram 600 for processor address generation. Processor address generation can be used for determining an instruction execution sequence for instructions within a function, program, procedure, routine, and so on. Processor address generation includes address manipulation using indices and tags. A first index is generated from one or more bits of a processor program counter, where the first index is used to access a branch predictor bimodal table. A first branch prediction is provided from the bimodal table, based on the first index. The first branch prediction is matched against N tables, where N is three or more, where the tables contain prior branch histories, and where: the branch history in table T(N) is of greater length than the branch history of table T(N-1); and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring.

A processor address 670 can be used to control execution of a sequence of instructions by the processor 610. The processor address can be loaded into a program counter (PC) 612, where the address within the program counter points to a next instruction to be executed by the processor. The processor can include one or more processors and can be based on one or more processing elements within a reconfigurable fabric, a parallel processor, a mesh processor, a distributed processor, programmable integrated circuits such as FPGAs or ASICs, and so on. When the processor is executing instructions sequentially, the address within the PC can be incremented simply to point to the next instruction in the sequence of instructions being executed. If the instruction being executed includes a branch instruction, then the sequence in which instructions can be executed can be altered by the branch instruction. Altering the execution sequence of the instructions can be based on a jump instruction, a branch instruction, and the like. A branch instruction can include an unconditional branch instruction for which the branch is always taken (e.g. a jump). A branch instruction can include a conditional branch instruction for which the branch is taken based on a condition or not taken otherwise.

Generating the processor address includes index generation 620. A first index can be generated from one or more bits of the processor program counter 612. The processor program counter can be used to point to the next instruction to be fetched for execution. The program counter can be updated after an instruction fetch. The first index can be used to access a branch prediction from a bimodal table 630. The bimodal table can include a history of branches that were taken by executing instructions, predictions based on analysis of the code, default values, and so on. An address of a branch instruction can be used as an index into the bimodal table. The contents of the bimodal table that can be accessed using the branch instruction address can include prediction bits. The prediction bits can be used to predict whether the branch is taken. In embodiments, the branch prediction received from the bimodal table can be used to determine the processor address.

In embodiments, the first branch prediction 640 is matched against N tables. The quantity N of tables can include one table, two tables, and so on. In embodiments, the quantity N can include three or more tables. The tables, such as table T(N) 650, table T(N-1) 652, and table T(N-2) 654 can contain prior branch histories. The branch histories can be recorded for one or more branch instructions within a program, code, procedure, etc., being executed by the processor 610. The N tables can include tables of varying lengths. In embodiments, the branch history in table T(N) can be of greater length than the branch history of table T(N-1), and the branch history in table T(N-1) can be of greater length than the branch history of table T(N-2). The branch history tables of different lengths can be used by various branch prediction techniques. The different table lengths can be determined based on optimizing cache sizes for storing the tables. The different table lengths can be used to capture branching patterns such as a given branch being taken every other time the instruction is executed, every third time, and so on. One or more branch prediction hits can occur in one or more branch history tables. Branch histories of different lengths can be determined. The greater the length of branch prediction hits, the more likely the branch prediction is valid or of greater usefulness. The matching 660 can be based on a greatest length of hits of branch prediction matches from the N tables. In embodiments, the length of hits of branch prediction matches is based on one or more hits occurring.

The greatest length of hits of branch prediction matches can be used to manipulate a processor address 670. The manipulated processor address can include the address of a next instruction within a sequence of instructions when it is predicted that that the branch will not be taken. The manipulated processor address can include the address of an instruction which is not included within the sequence of instructions. The address of an instruction, the address that does not appear within the sequence of instructions, or the manipulated processor address of another sequence of instructions, can result from the prediction that the branch will be taken. Recall that the matching can be based on at least one match. When no match occurs within the N tables, then the branch predictor address can be manipulated using the first branch prediction from the bimodal table, based on zero hits occurring. This latter matching, based on zero match hits occurring, can act as a default prediction. The default prediction, such as branch always taken or branch never taken, can be used when no branch history is available for a given branch, insufficient branch history is available, and so on.

Figure 7:
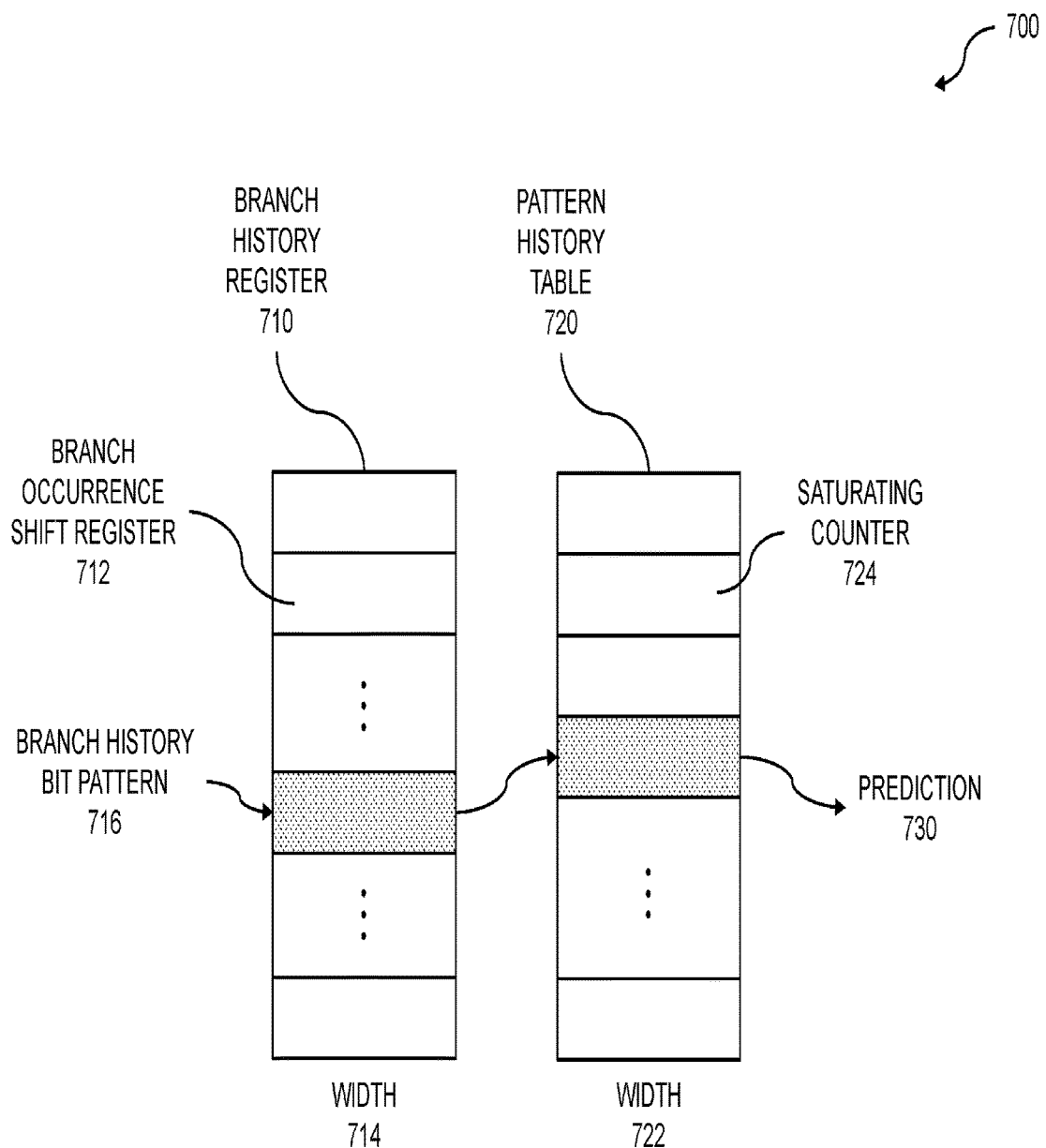
FIG. 7 shows branch prediction.

FIG. 7 shows branch prediction. In software coding, programming, etc., a branch instruction is an instruction that causes a change in instruction execution sequence based on a condition. The branch instruction can include an unconditional branch which is always taken, or a conditional branch which may or may not be taken based on a condition. A conditional branch can include a two-way branch for which a condition is met or not met; a multi-way branch for which two or more conditions can be evaluated, and so on. When a condition is met, the sequence of instructions that is executed can be changed. Branch prediction seeks to predetermine a likelihood that a given branch will be taken. Branch prediction can be used for address manipulation using indices and tags. A first index is generated from one or more bits of a processor program counter, wherein the first index is used to access a branch predictor bimodal table. A first branch prediction is generated from the bimodal table, based on the first index. The first branch prediction is matched against N tables, where N is three or more, where the tables contain prior branch histories, and where: the branch history in table T(N) is of greater length than the branch history of table T(N-1); and the branch history in table T(N-1) is of greater length than the branch history of table T(N-2). A processor address is manipulated using a greatest length of hits of branch prediction matches from the N tables, based on one or more hits occurring. The branch predictor address is manipulated using the first branch prediction from the bimodal table, based on zero hits occurring.

A technique for branch prediction including two-level branch prediction is shown 700. Two-level or correlation-based branch prediction can include a branch history register 710. The branch history register can include one or more branch occurrence shift registers such as 712. A branch occurrence shift register can be associated with each branch instruction within a code, a program, a function, a routine, and so on. A branch occurrence shift register includes a width 714, where the width includes one or more bits. The bits within the branch occurrence shift register include zeros that indicate that the branch was not taken, and ones that indicate that the branch was taken. For example, a string of three bits 010 within the branch occurrence shift register would indicate that the given branch was not taken, taken, and not taken, respectively. A branch history bit pattern 716 can be stored within one of the branch occurrence shift registers of the branch history register. The branch history can include a number of bits such as two bits, three bits, four bits, and so on. The bit pattern within the branch occurrence shift register 712 can be used as an address or a pointer into a pattern history table 720. The pattern history table can have an entry for each pattern of bits in a given branch occurrence shift register. In a usage example, the pattern of bits based on a 2-bit history would include 00, 01, 10, and 11.

The pattern history table can include one or more saturating counters such as saturating counter 724. The saturating counter can have a width 722. The saturating counter can include a 2-bit saturating counter, a 3-bit saturating counter, and so on. The saturating counter can change state based on a number of times a branch is taken. The states of the saturating counter can indicate whether a current branch is taken, whether a previous branch was taken, etc. The states for a 2-bit saturating counter can include strongly taken, weakly taken, weakly not taken, strongly not taken, and so on. Based on the current state of the saturating counter and whether the branch was taken, the state of the saturating counter can change. The pattern history table can be used to generate a prediction 730. The prediction can be based on a pattern such as a pattern indicating when a branch is taken. The pattern can include the branch being taken every second time the branch is encountered, every third time, and so on.

Figure 8:
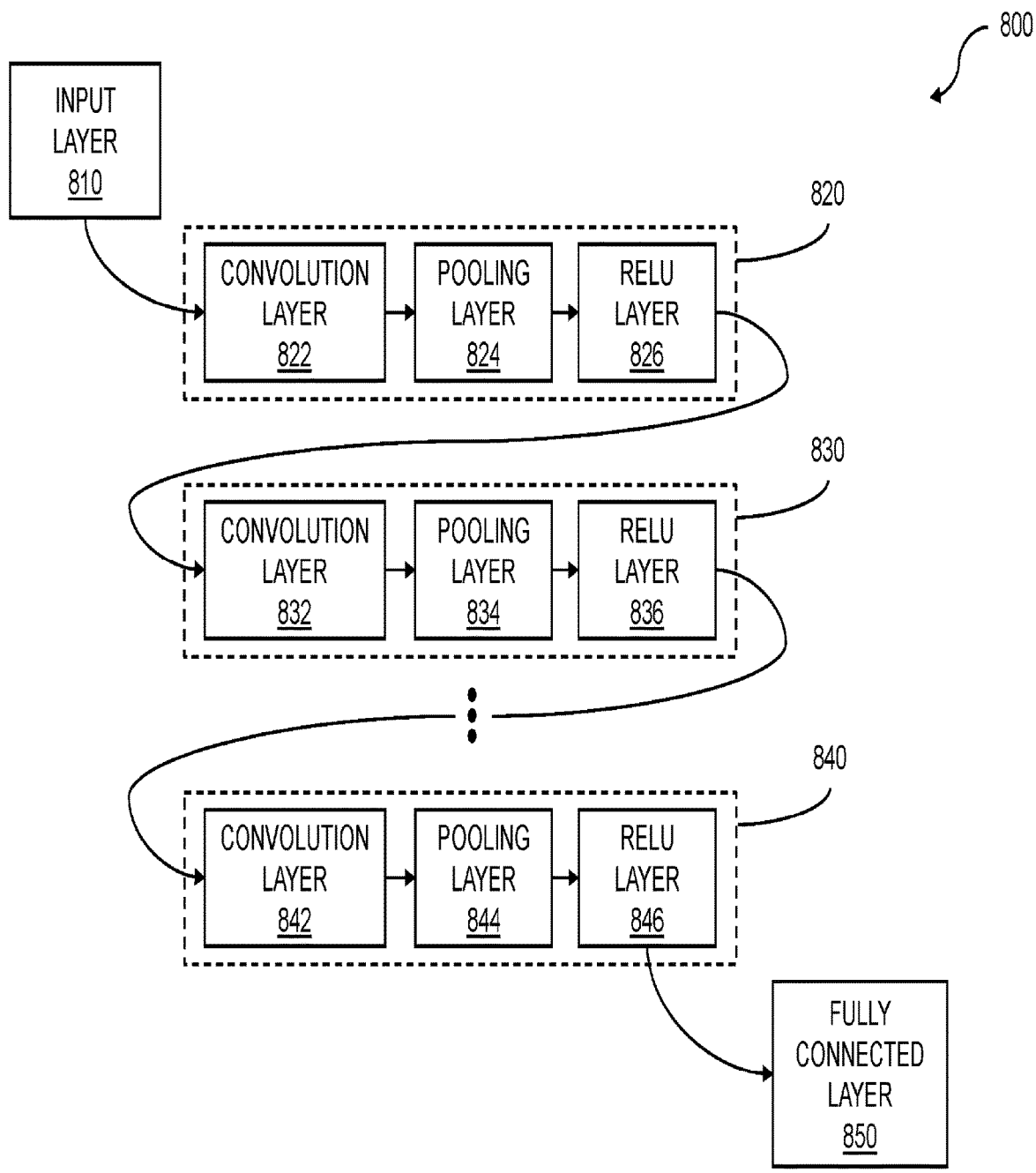
FIG. 8 illustrates a deep learning block diagram.

FIG. 8 illustrates a deep learning block diagram. The deep learning block diagram 800 can include a neural network such as a deep neural network (DNN), a convolutional neural network (CNN), a recurrent neural network (RNN), and so on. A convolutional neural network can be based on layers, where the layers can include input layers, output layers, fully connected layers, convolution layers, pooling layers, rectified linear unit (ReLU) layers, bottleneck layers, and so on. The layers of the convolutional network can be implemented using a reconfigurable processor, a reconfigurable fabric, and so on. Deep learning can be applied to adapting one or more models such as models for branch prediction. Branch prediction can be based on a prediction model. The prediction model can adapt over time based on a rate of prediction matches. The prediction model can adapt over time based on results of deep learning. Deep learning can support address manipulation using indices and tags. The layers of the neural network such as the convolutional neural network can be implemented within one or more reconfigurable processors, integrated circuits or chips, and so on, where the chips can include a reconfigurable fabric, an FPGA, an ASIC, and the like. A given chip from among the one or more chips can implement one or more layers of the neural network. When a neural network such as a convolutional neural network cannot be loaded into a reconfigurable fabric, the neural network may be partitioned, where a partition may "fit" into the reconfigurable fabric, FPGA, ASIC, etc.

A deep learning block diagram 800 is shown. The block diagram can include various layers, where the layers can include an input layer, hidden layers, a fully connected layer, and so on. In some embodiments, the deep learning block diagram can include a classification layer. The input layer 810 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 800, which can represent a network such as a convolutional neural network, can contain a plurality of hidden layers. While three hidden layers, a first hidden layer 820, a second hidden layer 830, and a third hidden layer 840 are shown, other numbers of hidden layers may be present. Each hidden layer can include layers that perform various operations, where the various layers can include a convolution layer, a pooling layer, and a rectified layer such as a rectified linear unit (ReLU) layer. Thus, a first layer 820 can include a convolution layer 822, a pooling layer 824, and a ReLU layer 826; a second layer 830 can include a convolution layer 832, a pooling layer 834, and a ReLU layer 836; and a third layer 840 can include a convolution layer 842, a pooling layer 844, and a ReLU layer 846. The convolution layers 822, 832, and 842 can perform convolution operations; the pooling layers 824, 834, and 844 can perform pooling operations, including max pooling, such as data down-sampling; and the ReLU layers 826, 836, and 846 can perform rectification operations. A convolutional layer can reduce the amount of data feeding into a fully connected layer. The block diagram 800 can include a fully connected layer 850. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs can be configured in arrangements such as quads and can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed to enter configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence the operation of an entire system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 9:
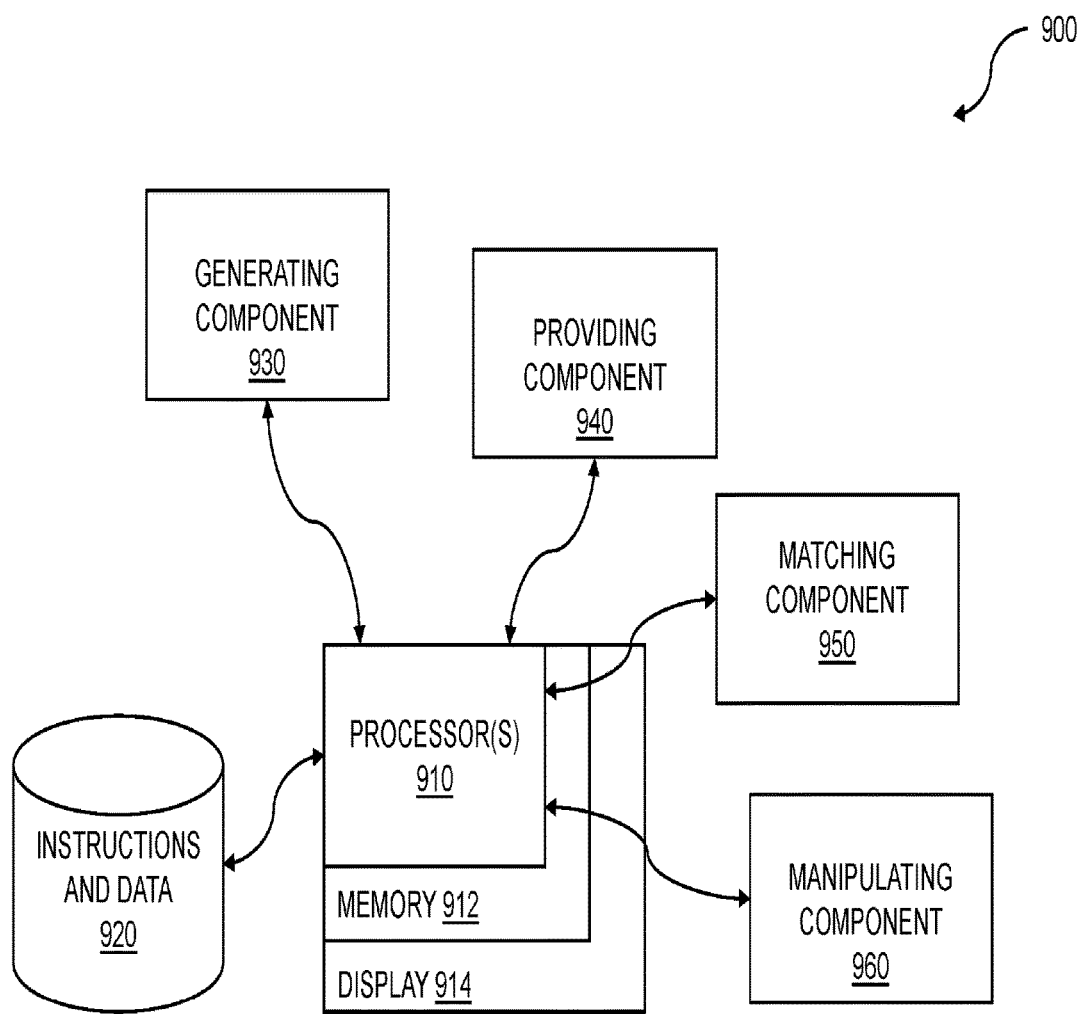
FIG. 9 is a system diagram for address manipulation.

FIG. 9 is a system diagram for address manipulation. The system 900 can include one or more processors 910 coupled to a memory 912 which stores instructions. The system 900 can include a display 914 coupled to the one or more processors 910 for displaying data, intermediate steps, instructions, and so on. In embodiments, one or more processors 910 are attached to the memory 912 where the one or more processors, when executing the instructions which are stored, are configured to: generate a first index from one or more bits of a processor program counter, wherein the first index is used to access a branch predictor bimodal table; provide a first branch prediction from the bimodal table, based on the first index; match the first branch prediction against N tables, wherein N is three or more, wherein the tables contain prior branch histories, and wherein: the branch history in table T(N) is of greater length than the branch history of table T(N-1); and the branch history in table T(N-1) is of greater length than the branch history of table T(N-2); manipulate a processor address using a greatest length of hits of branch prediction matches from the N tables, based on one or more hits occurring; and manipulate the branch predictor address using the first branch prediction from the bimodal table, based on zero hits occurring.

The system 900 can include a collection of instructions and data 920. The instructions and data 920 may be stored in a database, one or more statically linked libraries, one or more dynamically linked libraries, precompiled headers, source code, flow graphs, or other suitable formats. The instructions can include instructions for address manipulation using indices and tags. In embodiments, the processors can include processing elements within a reconfigurable fabric, a parallel processor, a mesh processor, a distributed processor, programmable integrated circuits such as FPGAs or ASICs, and so on. The system 900 can include a generating component 930. The generating component can include functions and instructions for generating a first index from one or more bits of a processor program counter, where the first index is used to access a branch predictor bimodal table. The branch predictor bimodal table can include using an address of a branch instruction as an index to the bimodal table. The branch predictor bimodal table can include a table T(N). Other tables can also be used. Embodiments include generating a second, a third, and a fourth index, wherein the second index is used in table T(N), the third index is used in table T(N-1), and the fourth index is used in table T(N-2). Various techniques can be used to generate indices. In embodiments, the second, third, and fourth indices are generated using hashing.

The system 900 can include a providing component 940. The providing component can include functions and instructions for providing a first branch prediction from the bimodal table, based on the first index. The branch prediction can be based on an analysis of the code or instructions, a branch prediction speculation, and so on. In embodiments, instructions relating the branch predicted to be taken can be fetched and speculatively executed. Speculative execution can include prefetching, pre-decoding, pre-execution, etc. instructions relating to the predicted branch. The system 900 can include a matching component 950. The matching component can include functions and instructions for matching the first branch prediction against N tables, wherein N is three or more. The contents of the N tables can include branch histories. The branch histories that can be accumulated as code or instructions are executed. Branch histories can include a number of prior branches such as three or more prior branches. The matching the first branch prediction can include the branch history in table T(N) being of greater length than the branch history of table T(N-1); and the branch history in table T(N-1) being of greater length than the branch history of table T(N-2).

The system 900 can include a manipulating component 960. The manipulating component can include functions and instructions for manipulating a processor address using a greatest length of hits of branch prediction matches from the N tables, based on one or more hits occurring. Branches with branch predictions that receive more hits from matching a branch prediction against the N tables may be more likely to be taken when the branch instruction is again executed. The manipulating component can further include manipulating the branch predictor address using the first branch prediction from the bimodal table, based on zero hits occurring. The manipulating the branch predictor address using the first branch prediction from the bimodal table can include a default manipulation when the branch instruction may not have been encountered previously or may not be within a threshold number of machine cycles. In embodiments, the manipulating the branch predictor address can be used for accessing a branch predictor array. The branch predictor array can include the three or more tables. In other embodiments, the processor address that was manipulated is used as a fetch address. The fetch address can be used to obtain one or more next instructions for execution.

The system 900 can include a computer program product embodied in a non-transitory computer readable medium for address manipulation, the computer program product comprising code which causes one or more processors to perform operations of: generating a first index from one or more bits of a processor program counter, wherein the first index is used to access a branch predictor bimodal table; providing a first branch prediction from the bimodal table, based on the first index; matching the first branch prediction against N tables, wherein N is three or more, wherein the tables contain prior branch histories, and wherein: the branch history in table T(N) is of greater length than the branch history of table T(N-1); and the branch history in table T(N-1) is of greater length than the branch history of table T(N-2); manipulating a processor address using a greatest length of hits of branch prediction matches from the N tables, based on one or more hits occurring; and manipulating the branch predictor address using the first branch prediction from the bimodal table, based on zero hits occurring.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method comprising:
   accessing, based on a one or more bits of a first processor address, a first branch prediction for a program;
   matching the first branch prediction against a plurality of N tables, wherein:
      each of the plurality of N tables contain prior branch histories;
      the branch history in table T(N) is of greater length than the branch history of table T(N-1);
   determining, for each of the plurality of N tables, a number of hits for that table, each hit comprising a match between the prior branch history in that table and the first branch prediction; and
   when a number of hits for at least one table is greater than zero, then manipulating a second processor address according to one or more predictions from the table that has the greatest number of hits.

2. The method of claim 1, further comprising when none of the plurality of N tables has a number of hits that is greater than zero, then manipulating a branch predictor address according to the first branch prediction, wherein the first branch prediction is provided from a bimodal table.

3. The method of claim 1, further comprising updating content in the plurality of N tables based on the hits.

4. The method of claim 3, wherein the content comprises the prior branch histories.

5. The method of claim 3, wherein the content comprises one or more hysteresis counters.

6. The method of claim 3, wherein the content comprises one or more prediction counters.

7. A system comprising one or more processors and a non-transitory computer readable storage media embodying instructions coupled to the one or more processors, the one or more processors operable to execute the instructions to:
   access, based on a one or more bits of a first processor address, a first branch prediction for a program;
   match the first branch prediction against a plurality of N tables, wherein:
      each of the plurality of N tables contain prior branch histories;
      the branch history in table T(N) is of greater length than the branch history of table T(N-1);
   determine, for each of the plurality of N tables, a number of hits for that table, each hit comprising a match between the prior branch history in that table and the first branch prediction; and
   when a number of hits for at least one table is greater than zero, then manipulate a processor address according to one or more predictions from the table that has the greatest number of hits.

8. The system of claim 7, wherein the processors are further operable to execute the instructions to, when none of the plurality of N tables has a number of hits that is greater than zero, then manipulating a branch predictor address according to the first branch prediction, wherein the first branch prediction is provided from a bimodal table.

9. The system of claim 7, wherein the processors are further operable to execute the instructions to update content in the plurality of N tables based on the hits.

10. The system of claim 9, wherein the content comprises the prior branch histories.

11. The system of claim 9, wherein the content comprises one or more hysteresis counters.

12. The system of claim 9, wherein the content comprises one or more prediction counters.

13. The system of claim 7 wherein the processors are further operable to execute the instructions to populate one or more of the N tables based on runtime sampling of instruction branches.

14. One or more non-transitory computer readable storage media embodying instructions and coupled to one or more processors that are operable to execute the instructions to:
   access, based on a one or more bits of a first processor address, a first branch prediction for a program;
   match the first branch prediction against a plurality of N tables, wherein:
      each of the plurality of N tables contain prior branch histories;
      the branch history in table T(N) is of greater length than the branch history of table T(N-1);
   determine, for each of the plurality of N tables, a number of hits for that table, each hit comprising a match between the prior branch history in that table and the first branch prediction; and
   when a number of hits for at least one table is greater than zero, then manipulate a processor address according to one or more predictions from the table that has the greatest number of hits.

15. The media of claim 14, wherein the processors are further operable to execute the instructions to, when none of the plurality of N tables has a number of hits that is greater than zero, then manipulating a branch predictor address according to the first branch prediction, wherein the first branch prediction is provided from a bimodal table.

16. The media of claim 14, wherein the processors are further operable to execute the instructions to update content in the plurality of N tables based on the hits.

17. The media of claim 16, wherein the content comprises the prior branch histories.

18. The media of claim 16, wherein the content comprises one or more hysteresis counters.

19. The media of claim 16, wherein the content comprises one or more prediction counters.

20. The media of claim 14, wherein the processors are further operable to execute the instructions to populate one or more of the N tables based on runtime sampling of instruction branches.

* * * * *